(12) United States Patent
Thörn

(10) Patent No.: US 8,134,597 B2
(45) Date of Patent: Mar. 13, 2012

(54) CAMERA SYSTEM WITH TOUCH FOCUS AND METHOD

(75) Inventor: Karl Ola Thörn, Malmo (SE)

(73) Assignee: Sony Ericsson Mobile Communications AB, Lund (SE)

(*) Notice: Subject to any disclaimer, the term of this patent is extended or adjusted under 35 U.S.C. 154(b) by 546 days.

(21) Appl. No.: 12/328,830

(22) Filed: Dec. 5, 2008

(65) Prior Publication Data
US 2010/0141826 A1    Jun. 10, 2010

(51) Int. Cl.
| | |
|---|---|
| G03B 13/00 | (2006.01) |
| H04N 5/232 | (2006.01) |
| H04N 5/225 | (2006.01) |
| G09G 5/00 | (2006.01) |
| G06F 3/041 | (2006.01) |

(52) U.S. Cl. ......... 348/169; 348/345; 345/169; 345/173
(58) Field of Classification Search .................. 348/169, 348/345, 208.14
See application file for complete search history.

(56) References Cited

U.S. PATENT DOCUMENTS

| | | | |
|---|---|---|---|
| 4,720,805 A | | 1/1988 | Vye |
| 5,187,585 A * | | 2/1993 | Kaneda et al. ................ 348/347 |
| 5,706,049 A * | | 1/1998 | Moghadam et al. ..... 348/333.03 |
| 6,226,388 B1 * | | 5/2001 | Qian et al. ..................... 382/103 |
| 2003/0142209 A1 * | | 7/2003 | Yamazaki et al. ............. 348/143 |
| 2004/0119744 A1 * | | 6/2004 | Chan ............................... 345/763 |
| 2004/0189804 A1 * | | 9/2004 | Borden et al. ................. 348/169 |
| 2005/0018066 A1 * | | 1/2005 | Hofer ....................... 348/333.02 |
| 2005/0129311 A1 * | | 6/2005 | Haynes et al. ................ 382/170 |
| 2006/0034601 A1 | | 2/2006 | Andersson et al. |
| 2007/0201076 A1 * | | 8/2007 | Ishida .......................... 358/1.14 |
| 2008/0278589 A1 | | 11/2008 | Thorn |
| 2009/0174805 A1 * | | 7/2009 | Alberth et al. ................ 348/345 |

FOREIGN PATENT DOCUMENTS

| | | |
|---|---|---|
| GB | 2224126 | 4/1990 |
| JP | 2002365519 | 12/2002 |

OTHER PUBLICATIONS

International Search Report and Written Opinion from corresponding International Application No. PCT/IB09/005856.
International Preliminary Report on Patentability from corresponding International Application No. PCT/IB09/005856.

* cited by examiner

*Primary Examiner* — Jason Chan
*Assistant Examiner* — Stephen Coleman
(74) *Attorney, Agent, or Firm* — Renner, Otto, Boisselle & Sklar, LLP

(57) ABSTRACT

Techniques for focusing a camera assembly on a moving object may include generating a preview video signal of a scene containing the object and analyzing the video signal to track movement of the moving object. As part of the analysis, a touch area for a touch sensitive electronic viewfinder of the camera assembly may be established. The touch area corresponds to the moving object and remains active in a former position of the object.

18 Claims, 4 Drawing Sheets

CAMERA SYSTEM WITH TOUCH FOCUS AND METHOD

TECHNICAL FIELD OF THE INVENTION

The technology of the present disclosure relates generally to photography and, more particularly, to a camera system and method for focusing on a moving object using touch input from a user.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras that are capable of capturing still images and video images.

Photographing a moving object is notoriously difficult. One issue is setting the camera's focus on the object in time to take the desired photo. For instance, attempting to take a picture of a moving child, a moving animal, or action during a sporting event commonly results in taking a picture that is not focused on the intended object. For instance, the intended object may move from the foreground to the background in the time between focusing and capturing image data for the photograph (e.g., in response to depressing a shutter release button).

In other situations, the photograph opportunity may be lost by the time the user may adjust the focus. Some digital cameras, for example, allow the user to select an object of interest by touching a corresponding area of an electronic viewfinder. By the time that the user touches the viewfinder, the object may have moved. Thus, the touched spot no longer corresponds to the object of interest and the focus may not be proper. By the time the user has the opportunity to retouch the electronic viewfinder to reset the focus, the object may no longer be in the desired location, may no longer be turned toward the camera, or the spontaneity of the situation may be lost.

SUMMARY

To enhance taking photographs of moving objects, the present disclosure describes an improved camera system and method that allows a user to set the camera's focus on a moving object by touching a "hit area" that is associated with the object. The hit area is a touch area of a touch sensitive electronic viewfinder. To facilitate the selection of the object by touching the corresponding hit area, the hit area may be adjusted based on behavior of the moving object. For example, the active duration of the hit area in a former location of the object on the electronic viewfinder may be maintained for a predetermined duration. Another adjustment may include increasing or decreasing the size of the hit area, and/or adding an area corresponding to a predicted location of the object.

In one embodiment, the disclosed techniques for touch focusing may involve a process of continuously caching movement data (e.g., for about 1.5 seconds) for objects in the scene; analyzing the data to determine how the objects move in time with respect to the viewfinder; dynamically recalculating (and possibly predicting) a touch area; and activating the touch area for a period of time (e.g., about 0.5 seconds). As will become more apparent, the disclosed techniques facilitate focusing on a moving item in a manner that was previously not possible using a conventional touch-focus approach. For instance, if a user desires to focus on a fast moving item, such as a flying bird, the user would most likely not be able to use conventional touch focusing to successfully set the focus of the camera. But the disclosed techniques provide reliable manners in which touch focus may be used to focus on the moving item.

According to one aspect of the disclosure, a camera assembly includes a touch sensitive electronic viewfinder; focusable imaging optics; an image sensor for converting light focused by the imaging optics into image data in the form of a preview video signal of a scene that contains a moving object; and a controller configured to analyze the video signal to track movement of the moving object; and establish a touch area for the touch sensitive electronic viewfinder, the touch area corresponding to the moving object and remaining active in a former position of the object.

According to one embodiment of the camera assembly, the touch area remains active in the former position for a predetermined amount of time.

According to one embodiment of the camera assembly, the object is an object that is recognized using a recognition engine or optical flow processing.

According to one embodiment of the camera assembly, in response to detection of touching of the touch area, the controller is further configured to control focusing of the imaging optics so that the camera assembly is focused on the object.

According to one embodiment of the camera assembly, the controller is further configured to capture image data and a store a photograph of the scene while the camera assembly is focused on the object.

According to one embodiment of the camera assembly, the controller is configured to repeat the analysis of the video signal and the establishment of the touch area so that the touch area moves in a path that follows movement of the object.

According to one embodiment of the camera assembly, the analysis includes detecting the object as a possible focus target.

According to one embodiment of the camera assembly, the controller is further configured to graphically highlight the focus target on the electronic viewfinder.

According to one embodiment of the camera assembly, at least one of a position of the touch area, a movement of the touch area or a size of the touch area is adjusted based on a model that predicts an amount of time a user will take to touch a displayed representation of the object.

According to one embodiment of the camera assembly, the touch area further includes a portion of the electronic viewfinder corresponding to a predicted location of the object.

According to another aspect of the disclosure, a method of focusing a camera assembly on a moving object includes generating a preview video signal of a scene containing the object; and analyzing the video signal to track movement of the moving object and to establish a touch area for a touch sensitive electronic viewfinder of the camera assembly, the touch area corresponding to the moving object and remaining active in a former position of the object.

According to one embodiment of the method, the touch area remains active in the former position for a predetermined amount of time.

According to one embodiment of the method, the object is an object that is recognized using a recognition engine or optical flow processing.

According to one embodiment, the method further includes detecting touching of the touch area and focusing the camera assembly on the object.

According to one embodiment, the method further includes capturing image data of the scene and storing a photograph of the scene while the camera assembly is focused on the object.

According to one embodiment, the method further includes repeating the analyzing and establishing of the touch area so that the touch area moves in a path that follows movement of the object.

According to one embodiment, the method further includes detecting the object as a possible focus target.

According to one embodiment, the method further includes graphically highlighting the focus target on the electronic viewfinder.

According to one embodiment of the method, the camera assembly forms part of a mobile telephone.

According to one embodiment, the method further includes adjusting at least one of a position of the touch area, a movement of the touch area or a size of the touch area based on a model that predicts an amount of time a user will take to touch a displayed representation of the object.

According to another aspect of the disclosure, a camera assembly includes a touch sensitive electronic viewfinder; imaging optics; an image sensor for converting light focused by the imaging optics into image data in the form of a preview video signal of a scene that contains a moving object; and a controller configured to analyze the video signal to track movement of the moving object; establish a touch area for the touch sensitive electronic viewfinder, the touch area corresponding to the moving object and remaining active in a former position of the object; and in response to detection of touching of the touch area, adjusting at least one of a zoom setting so as to increase a relative size of the moving object in the viewfinder or a camera setting to adjust at least one of white balance, sensitivity, brightness, or flash settings based on the moving object.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
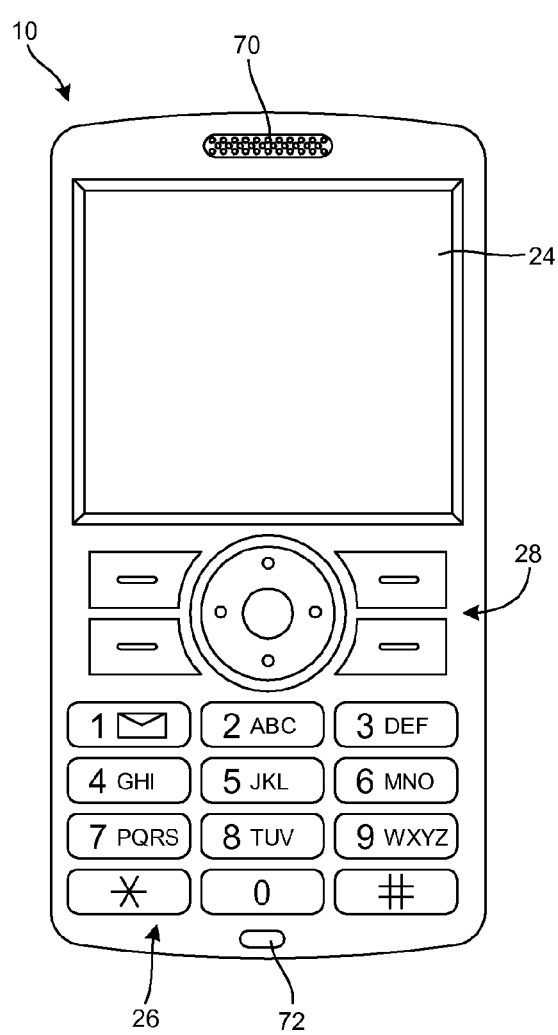
FIGS. 1 and 2 are respectively a front view and a rear view of an exemplary electronic device that includes a representative camera assembly.

Embodiments will now be described with reference to the drawings, wherein like reference numerals are used to refer to like elements throughout. It will be understood that the figures are not necessarily to scale.

Described below in conjunction with the appended figures are various embodiments of an improved camera system and method of camera operation. In the illustrated embodiments, the camera system is embodied as a digital camera assembly that is made part of a mobile telephone. It will be appreciated that the disclosed camera technology may be applied to other operational contexts such as, but not limited to, a dedicated camera or another type of electronic device that has a camera. Examples of these other devices include, but are not limited to a video camera, a navigation device (commonly referred to as a "GPS" or "GPS device"), a personal digital assistant (PDA), a media player, a gaming device, a "web" camera, a computer (including an "ultra-mobile PC" and other types of computers), and an accessory for another electronic device. The camera assembly may be used to capture image data in the form of still images, also referred to as pictures and photographs, but it will be understood that the camera assembly may be capable of capturing video images in addition to still images.

Figure 2:
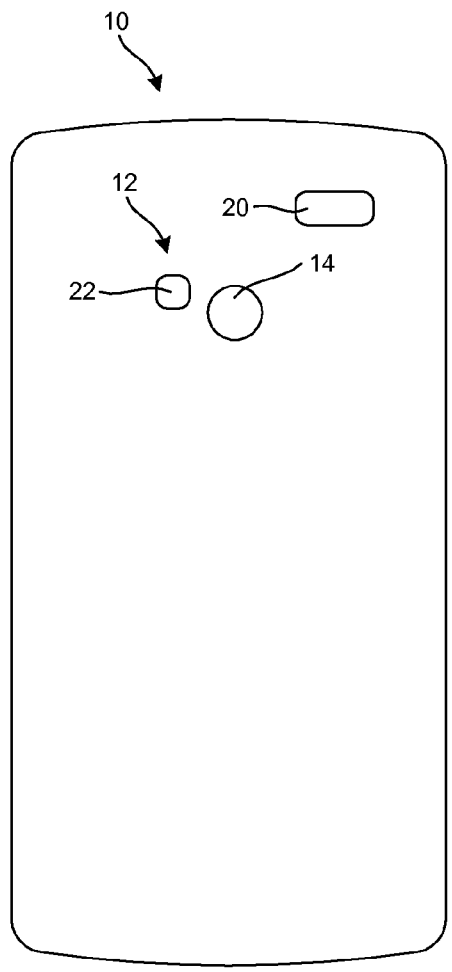

Referring initially to FIGS. 1 and 2, an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above.

Figure 3:
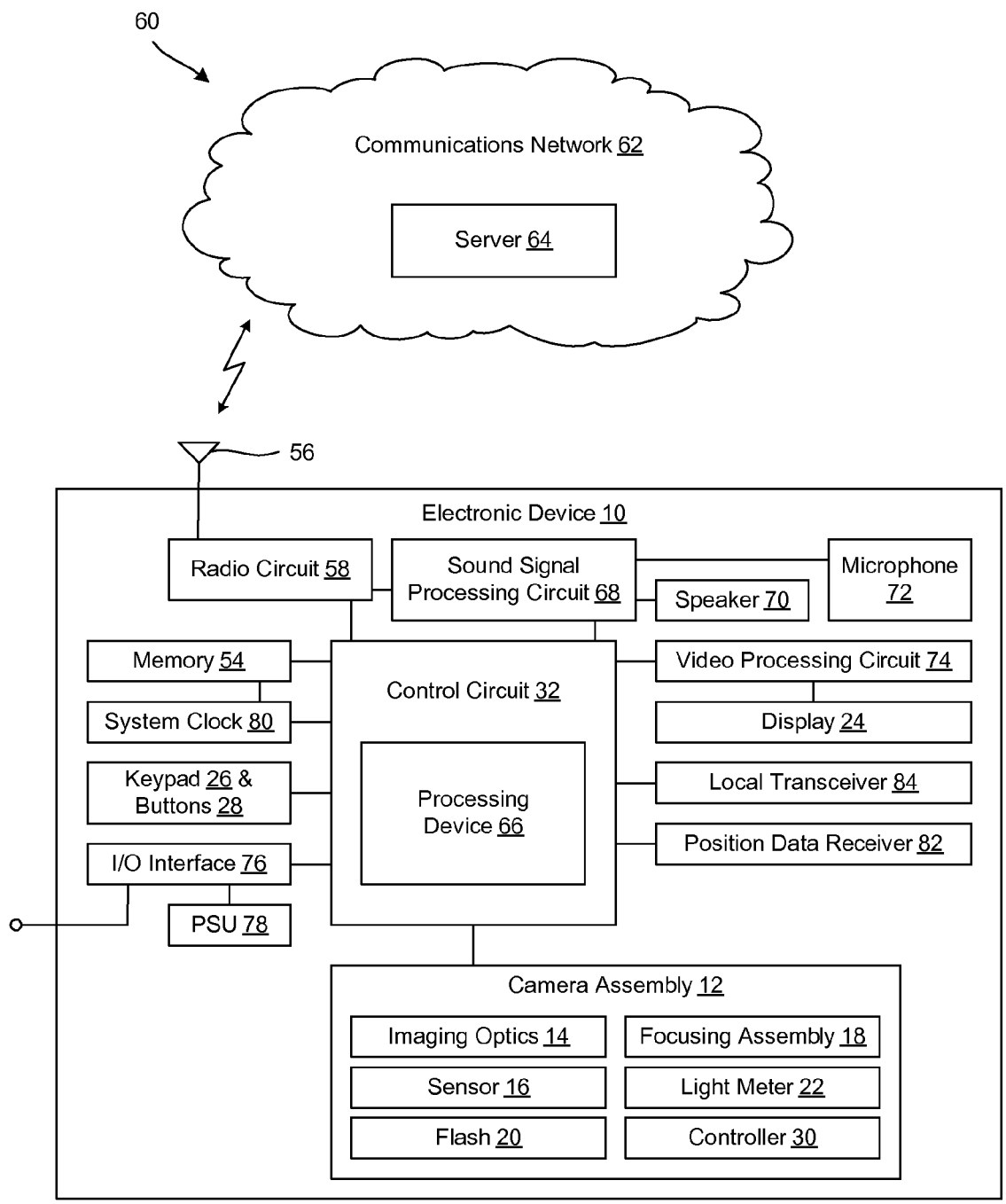
FIG. 3 is a schematic block diagram of the electronic device of FIGS. 1 and 2 as part of a communications system in which the electronic device may operate.

With additional reference to FIG. 3, the camera assembly 12 may be arranged as a typical camera assembly that includes imaging optics 14 to focus light from a scene within the field of view of the camera assembly 12 onto a sensor 16. The sensor 16 converts the incident light into image data. The imaging optics 14 may include a lens assembly and components that that supplement the lens assembly, such as a protective window, a filter, a prism, and/or a mirror. To adjust the focus of the camera assembly 12, a focusing assembly 18 that includes focusing mechanics and/or focusing control electronics may be present in conjunction with the imaging optics 14. A zooming assembly also may be present to optically change the magnification of captured images. Other camera assembly 12 components may include a flash 20, a light meter 22, a display 24 for functioning as an electronic viewfinder and as part of an interactive user interface, a keypad 26 and/or buttons 28 for accepting user inputs, an optical viewfinder (not shown), and any other components commonly associated with cameras. One of the buttons 28 may be a shutter key that the user may depress to command the taking of a photograph.

Another component of the camera assembly 12 may be an electronic controller 30 that controls operation of the camera assembly 12. The controller may be embodied, for example, as a processor that executes logical instructions that are stored by an associated memory, as firmware, as an arrangement of dedicated circuit components or as a combination of these embodiments. Thus, the method of operating the camera assembly 12 may be physically embodied as executable code (e.g., software) that is stored on a computer or machine readable medium, or may be physically embodied as part of an electrical circuit. In another embodiment, the functions of the electronic controller 30 may be carried out by a control circuit 32 that is responsible for overall operation of the electronic device 10. In this case, the controller 30 may be omitted. In another embodiment, camera assembly 12 control functions may be distributed between the controller 30 and the control circuit 32.

The display 24 may be touch sensitive to receive user input. The sensor 16 may capture data at a predetermined frame rate to generate a preview video signal that is displayed on the display 24 for operation as an electronic viewfinder to assist the user compose photographs.

Figure 4:
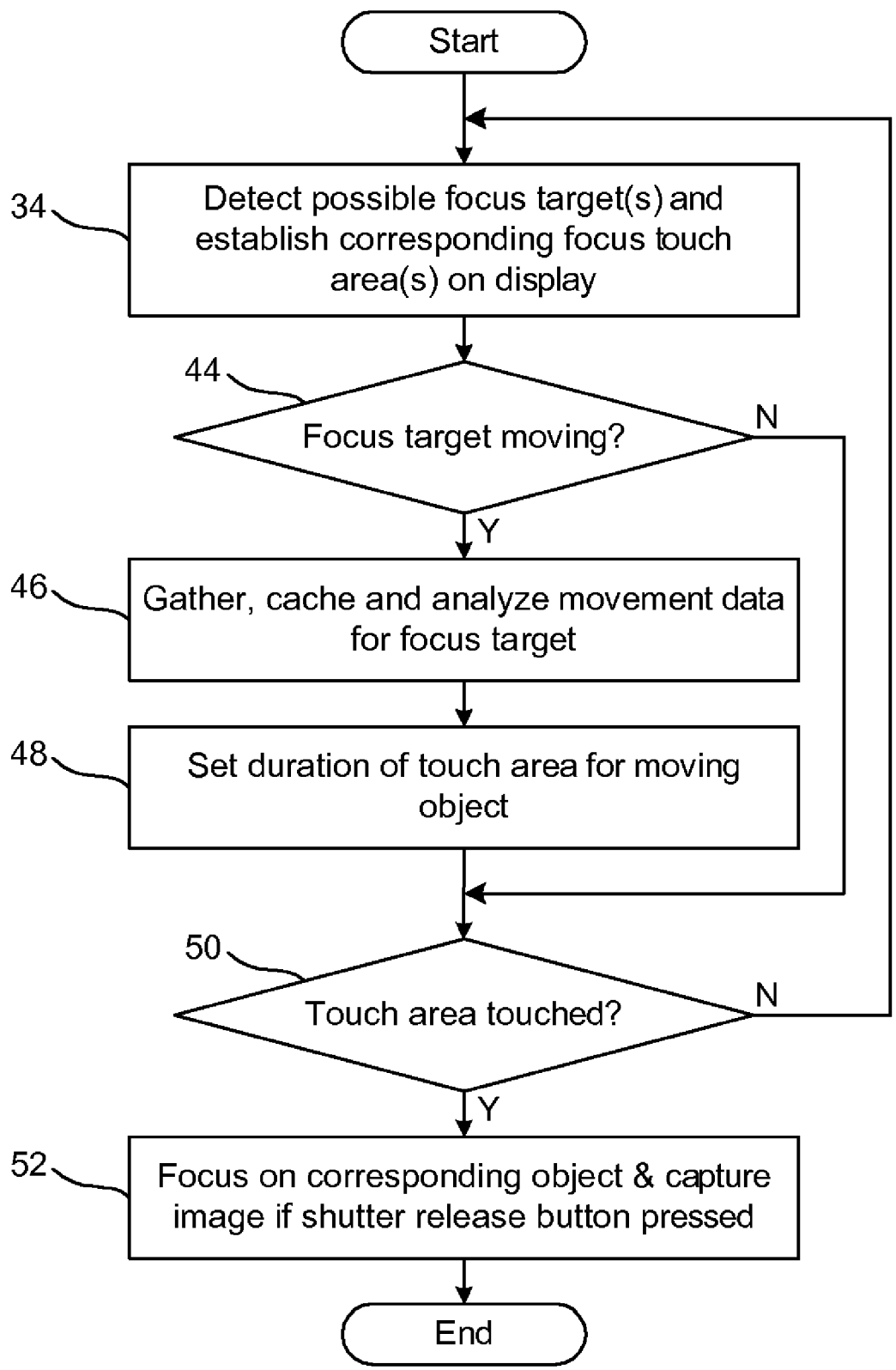
FIG. 4 is a flow diagram of an exemplary technique for touch focusing.

With additional reference to FIG. 4, illustrated is a flow diagram of an exemplary method of operating a camera assembly 12 to focus on a moving object. The exemplary method may be carried out by executing code stored by the electronic device 10, for example. Thus, the flow chart of FIG. 4 may be thought of as depicting steps of a method carried out by the electronic device 10.

Variations to the illustrated method are possible and, therefore, the illustrated embodiment should not be considered the only manner of carrying out the techniques that are disclosed in this document. Also, while FIG. 4 shows a specific order of executing functional logic blocks, the order of executing the blocks may be changed relative to the order shown. In addition, two or more blocks shown in succession may be executed concurrently or with partial concurrence. Certain blocks also may be omitted.

The logical flow may begin in block 34 where the control logic analyzes the preview video signal for objects that may be of interest to the user and/or which may serve as the basis for targets upon which to set the focus of the camera assembly 12. In one embodiment, possible focus targets may be detected by using a form of computer or machine vision that analyzes the scene represented by the video signal for one or more of faces of people, silhouettes of people, animals, or other recognizable objects (e.g., cars, boats, etc.). It will be appreciated that possible focus targets are not limited to these items. Detection of possible focus targets may be carried out using any appropriate technique, such as face detection or optical flow processing. Other techniques may include face recognition, silhouette detection, animal detection, object recognition, optical character recognition (OCR), and so forth. Optical flow processing may be used to detect and track a moving item, but where recognition of the type of object is not a consideration. Rather, movement of the object drives the recognition process. As will be understood, optical flow is the pattern of apparent motion of an object, surface or edge in a visual scene.

Figure 5:
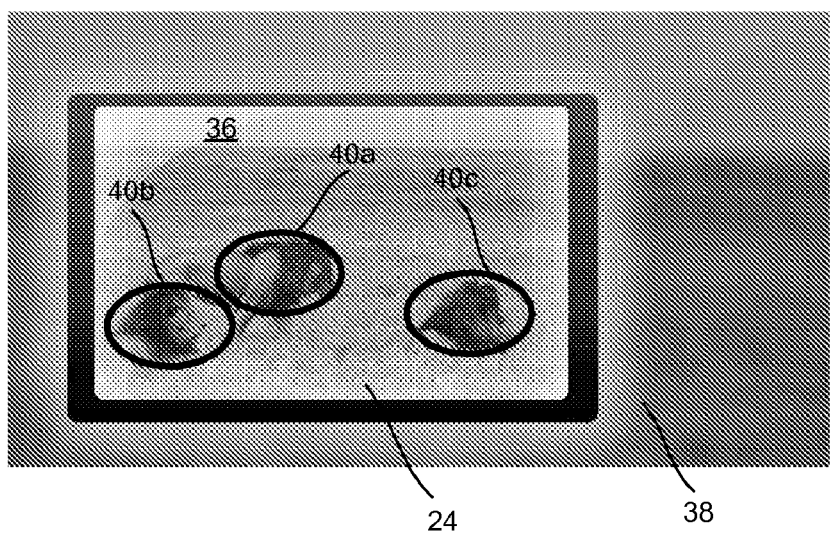
FIGS. 5 through 7 are exemplary representations of an electronic viewfinder while used for touch focusing.

With additional reference to FIG. 5, shown is an exemplary representation of an electronic viewfinder 24 that displays a preview image 36 of a portion of a scene 38. The displayed portion of the scene 38 is the portion of the scene that corresponds to the field of view of the camera assembly 12. In the example of FIG. 5, the scene is of a grassland with three lions. Using the analysis of block 34, the lions in this example may be detected as possible focus targets 40. Of these focus targets 40, a first focus target 40a is moving, a second focus target 40b is relatively stationary and third focus target 40c is relatively stationary.

To assist the user in visually identifying the objects in the scene 38 that have been identified as focus targets 40, the focus targets 40 may be graphically highlighted in an appropriate manner. In the illustrated embodiment, ovals are displayed around the focus targets 40. Other shapes may be employed, such as squares, rectangles, or other polygons. In one embodiment, the shape may be adapted to form a contour around the corresponding item and, therefore, approximate the shape of the item. In one embodiment, moving focus targets 40 may be graphically identified in a manner different from stationary focus targets 40. For instance, the color of the graphic highlight for moving focus target(s) 40 may be different than the color of the graphic highlight for stationary focus target(s) 40.

Figure 6:
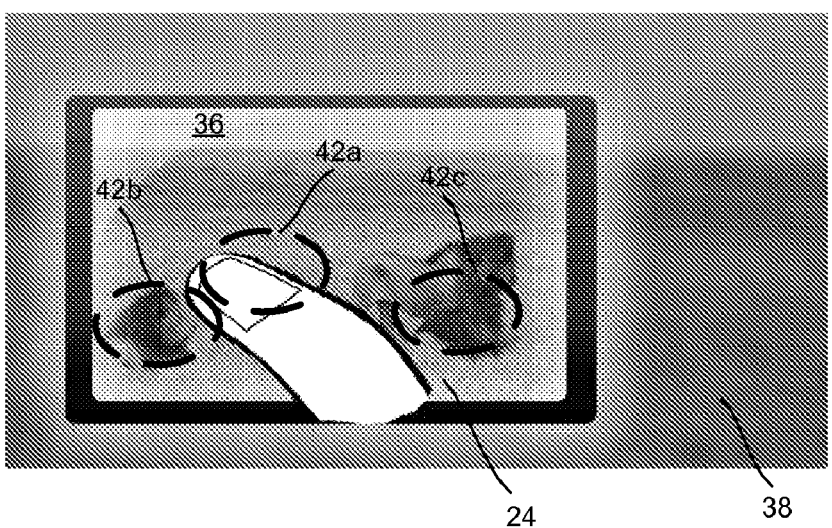

Also in block 34, and with additional reference to FIG. 6, a focus touch area 42 of the display 24 may be associated with each focus target 40. In this manner, each focus touch area 42 serves as a user input to allow the user to select a corresponding one of the focus targets 40. In the illustrated example, a first focus touch area 42a corresponds to the first focus target 40a, a second focus touch area 42b corresponds to the second focus target 40b and a third focus touch area 42c corresponds to the third focus target 40c. Upon user selection of a focus touch area 42 by pressing a corresponding portion of the display 24, the focusing assembly 18 may be controlled to adjust the imaging objects 14. In particular, the imaging objects 14 may be adjusted to bring into focus the object in the scene 38 corresponding to the associated touched focus touch area 42. Graphical representations of the focus touch areas 42 may or may not be displayed on the display 24.

With continued reference to the flow diagram of FIG. 4, the logical loop that follows block 34 may be carried out for each of the identified focus targets 38. However, for the sake of simplicity of the description, the remaining logical steps will be described with respect to one of the identified focus targets 40.

Following block 34, the logical flow may proceed to block 44 where a determination may be made as to whether the focus target 40 is moving. If the focus target 40 is moving, the logical flow may proceed to block 46. In block 46, the camera assembly 12 may gather and cache movement information in form of movement data, and analyze that movement data for the focus target 40. For example, successive frames of the preview video signal may be compared to determine and track the rate of movement and the direction of the movement of the focus target 40 with respect to the scene 38. In one embodiment, the movement data may be cached for about 1.5 seconds and may include data to determine how the focus target 40 moves in time with respect to the scene 38. In this manner, a relationship between the corresponding focus touch area 42 and the moving focus target 40 may be maintained, even though the position of the focus target 40 with respect to the viewfinder may move so as to be in a different location than the position of the focus touch area 42 that corresponds to the focus target 40.

Next, in block 48, an active duration for the touch area 42 for the moving focus target 40 is set. In one embodiment, the touch area 42 may remain active for about 0.5 seconds after the touch area 42 has been established. Even though the touch area 42 remains active at a stationary location within the viewfinder, the corresponding focus target 40 may move. By using the movement data, the current location of the focus target 40 is tracked. Assuming that a user will not actually touch the current position of the focus target 40 because the corresponding object in the scene 38 is moving (e.g., the user's touch reaction speed may be slower than the displayed representation of the object), the extended active duration of the touch area 42 for the focus target 40 may allow the user to touch a former location of the focus target 40. The maintained correlation between the touch area 42 and the focus target 40 allows the camera assembly 12 to be controlled to focus on the current location of the focus target 40 in response to user touching of the corresponding touch area 42, even though their relative locations may be different. In one embodiment, the tracking of the focus target 40 may incorporate predicting the location of the focus target 40 in one or more future frames of the preview video signal. Corrections to the predictions may be made based on incoming video frames. The predictive object tracking may facilitate the maintenance of the correlation between the touch area 42 and the focus target 40.

Following block 48 or following a negative determination in block 44, the logical flow may proceed to block 50. In block 50, a determination may be made as to whether the user touched one of the touch areas 42. If a negative determination is made, the logical flow may return to block 34 to redetect the focus targets and establish corresponding touch areas. It is noted that a moving focus target may have plural touch areas that "follow" the movement of the focus target. This may be caused by setting the active duration of a corresponding touch area in block 48 that survives the return to and processing of block 34. Although the "older" touch areas 42 will expire as time progresses, the unexpired touch areas 42 may aggregate to form a touch area trail and may collectively "follow" the moving focus target so that the user may touch a former location of the focus target to invoke focusing on the moving focus target.

If, in block 50, the user touches an active touch area 42, the logical flow may proceed to block 52. In response, the camera assembly 12 will focus on the object in the scene 38 that corresponds to the focus target 40 that is associated with the touched touch area 42. In accordance with the previous steps of the exemplary process, the focusing action will be carried out even if the object has moved relative to the location of the corresponding touch area 42.

Figure 7:
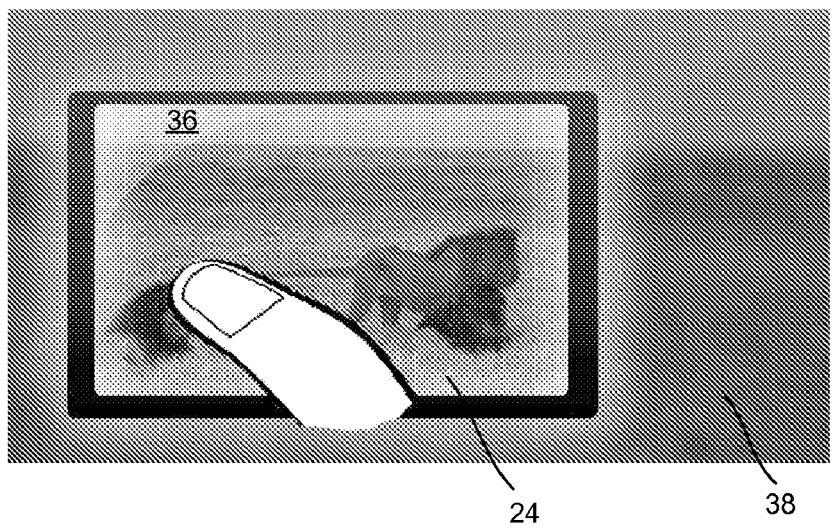

As an example, FIG. 7 depicts the user touching the display 24 in the location of a still active touch area 42a, but where the corresponding focus target 40a has moved to another location. The relationship between the touch area 42a and the focus target 40a is maintained during the time that the touch area 42a is active. Therefore, touch-based focusing may be made even though the object is in motion. If the user had touched one of the touch areas 42b or 42c that correspond to a relatively stationary focus target 40b or 40b, the camera assembly 12 will be controlled to focus on the object corresponding to the touched one of the touch areas.

Once the touch area is selected by the user, focus adjustment to focus on the corresponding object may be made. Furthermore, tracking of the movement of the object may be continued and focus adjustments may be made to keep the moving item in focus. If the user commands the taking of a photograph, the camera assembly 12 may capture image data for the photograph and store a corresponding image file in a memory 54 (FIG. 3).

Using a process for maintaining a correspondence between a touch area and a moving object, the movement of objects in the scene may be tracked and a relationship with a touch area that is established at a former location of the object may be preserved. In this manner, if the object is moving too fast for the user to touch the current location of the object, but the user does manage to touch a former location of the object, focusing on the desired object may be made.

It will be appreciated that the illustrated exemplary embodiment is just one technique for accomplishing touch focusing for a moving object. For example, the disclosed technique for touch focusing may be viewed as involving a process of continuously caching movement data (e.g., for about 1.5 seconds) for objects in the scene; analyzing the data to determine how the objects move in time with respect to the viewfinder; dynamically recalculating (and possibly predicting) a touch area; and activating the touch area for a period of time (e.g., about 0.5 seconds).

As indicated, the touch area 42 for a moving target 40 may be made to follow the target. In addition, for enhanced ergonomics, the size of the touch area 42 may be made to expand (or enlarge) as a function of time and/or as a function of the size of the corresponding moving item. In some circumstances, the size of the touch area may become larger than the representation of the corresponding object on the display 24. It is also possible that the size of the touch area 42 may be made to shrink (or decrease) as a function of time and/or as function of the size of the corresponding moving item.

For instance, Fitts' law may be applied to adjust the position or movement of the touch area 42 relative to the target 40 and/or the adjust the size of the touch area 42. Fitts' law is a model of human movement during a pointing action and is used to predict the time the user may take to touch the target as a function of the distance to the target and the size of the target. Considerations that may be taken into account to adjust the position, size and/or movement of the touch area may include, but are not limited to, size of the display 24 and orientation of the display 24 (e.g., landscape orientation or portrait orientation). Orientation may be determined using, for example, an accelerometer or data from the camera assembly 12. Other considerations may include current finger position, which if known, may be used to dynamically adjust the travel time to the target from the current finger position. This time may further be modified due to finger occlusion or whether the user is using his or her thumb or index finger, which serves as an indicator of one-handed or two-handed use to set focus. As will be understood, some touch screens are able to assess finger position and finger type.

As described, the touch area for an object in the scene may be active in locations corresponding to the trajectory that the object has already travelled. Further, the touch area may be adjusted (e.g., extended or shrunk) over time. In addition, the touch area may be extended into an area of predicted trajectory of the object. Therefore, the movement of the object not only may be tracked, but future movement and/or position of the object may be predicted based on past movement and speed of the object. Areas of the electronic viewfinder corresponding to the predicted location of the object may be added to the aggregate active touch area for the object. As an example, if a car is moving rapidly to the right, a future position of the car that is to the right of the current position may be predicted and a corresponding portion of the viewfinder may become active as a touch area for the car. Then, if the user were to touch the touch area located to the right of the car, the car would be selected and the camera assembly would focus on the car.

It is possible that there may be multiple focus targets and some of the corresponding touch areas may become closely spaced or overlap. In this case, the past and/or projected trajectories of the corresponding objects may be used to resolve which object has been selected when a user touches the electronic viewfinder. For instance, the user may touch the viewfinder and move his or her finger in the path that the object of interest has travelled and/or in the path that the user expects the object to travel. The relationship between the movement of the finger and the former and/or predicted movement of the object may be used to ascertain which object is intended to have been selected by the user.

In additional embodiments, the "facing" of the object may be used as part of establishing an appropriate touch area for the object. Facing may be used, for example, to add a predicted touch area in front of an object so that if the user attempts to select the object, the object may be successfully selected. Examples may be a runner about to start a race, a drag racing car lined up at staging and starting lights, a bird or other animal at rest, an airplane at the end of a runway, etc. A face detection and/or object silhouette detection engine may be used to identify the profile of such an object and the direction in which the object is facing. For these determinations, an appropriate predictive touch area may be added or an existing touch area may be expanded to account for possible future movement of the object.

The disclosed approaches to touch focusing may result in establishing camera focus that, in turn, enables improved shutter speed and sharper pictures. The approach is easy to use, even for those persons with average or below average hand eye coordination as the approach is implemented in an intuitive user interface and where the exactness of the user's touch to the current position of the desired object as represented on the viewfinder need not be very precise.

The disclosed techniques have application in a wide variety of situations where it previously may have been very difficult to focus on a moving object. Examples of these situations include, but are not limited to, focusing on a playing child, focusing on a domestic or wild animal (e.g., a cat, dog or a bird), focusing on a car, etc.

The disclosed techniques have been described in the context of still photography. However, the disclosed techniques are equally applicable to taking video.

Also, the disclosed techniques of selecting a moving object have been described in the context of setting the focus of a camera. The selecting of a moving object in the described manners also may be applied to other camera functions, such as optical and/or digital zooming. For instance, selection of a touch area for a target may result in zooming in on the corresponding object so that the object fills the viewfinder or fills a predetermined amount of the viewfinder. In one embodiment, the amount of the viewfinder that is filled by the object may be maintained as the object moves in the scene.

The selecting of a moving object in the described manner may be applied to settings other than focusing and/or zooming. For instance, adjustments to camera settings that affect image quality, such as white balance, sensitivity (e.g., ISO value), brightness, flash settings and so forth, may be based on metering on the object that corresponds to a touched touch area.

As indicated, the illustrated electronic device 10 shown in FIGS. 1 and 2 is a mobile telephone. Features of the electronic device 10, when implemented as a mobile telephone, will be described with additional reference to FIG. 3. The display 24 displays information to a user to enable the user to utilize the various features of the electronic device 10. The display 24 also may be used to visually display content received by the electronic device 10 and/or retrieved from the memory 54. The display 24 may be used to present images, video and other graphics to the user, such as photographs, mobile television content, Internet pages, and video associated with games.

The keypad 26 and/or buttons 28 provide for a variety of user input operations. For example, the keypad 26 may include alphanumeric keys for allowing entry of alphanumeric information. Navigation and select keys or a pointing device also may be present. Keys or key-like functionality also may be embodied as a touch screen associated with the display 24. Also, the display 24 and keypad 26 and/or buttons 28 may be used in conjunction with one another to implement soft key functionality.

The electronic device 10 includes communications circuitry that enables the electronic device 10 to establish communication with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 54, executing applications to allow user interaction with the data, displaying video and/or image content associated with the data, outputting audio sounds associated with the data, and so forth.

In the exemplary embodiment, the communications circuitry may include an antenna 56 coupled to a radio circuit 58. The radio circuit 58 includes a radio frequency transmitter and receiver for transmitting and receiving signals via the antenna 22. The radio circuit 58 may be configured to operate in a mobile communications system 60. Radio circuit 58 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 56 and the radio circuit 58 may represent one or more than one radio transceiver.

The system 60 may include a communications network 62 having a server 64 (or servers) for managing calls placed by and destined to the electronic device 10, transmitting data to and receiving data from the electronic device 10 and carrying out any other support functions. The server 64 communicates with the electronic device 10 via a transmission medium. The transmission medium may be any appropriate device or assembly, including, for example, a communications base station (e.g., a cellular service tower, or "cell" tower), a wireless access point, a satellite, etc. The network 62 may support the communications activity of multiple electronic devices 10 and other types of end user devices. As will be appreciated, the server 64 may be configured as a typical computer system used to carry out server functions and may include a processor configured to execute software containing logical instructions that embody the functions of the server 30 and a memory to store such software. In alternative arrangements, the electronic device 10 may wirelessly communicate directly with another electronic device 10 (e.g., another mobile telephone or a computer) and without an intervening network.

As indicated, the electronic device 10 may include a primary control circuit 32 that is configured to carry out overall control of the functions and operations of the electronic device 10. The control circuit 32 may include a processing device 66, such as a central processing unit (CPU), microcontroller or microprocessor. The processing device 66 executes code stored in a memory (not shown) within the control circuit 32 and/or in a separate memory, such as the memory 54, in order to carry out operation of the electronic device 10. The memory 54 may be, for example, one or more of a buffer, a flash memory, a hard drive, a removable media, a volatile memory, a non-volatile memory, a random access memory (RAM), or other suitable device. In a typical arrangement, the memory 54 may include a non-volatile memory for long term data storage and a volatile memory that functions as system memory for the control circuit 32. The memory 54 may exchange data with the control circuit 32 over a data bus. Accompanying control lines and an address bus between the memory 54 and the control circuit 32 also may be present.

The electronic device 10 further includes a sound signal processing circuit 68 for processing audio signals transmitted by and received from the radio circuit 24. Coupled to the sound processing circuit 36 are a speaker 70 and a microphone 72 that enable a user to listen and speak via the electronic device 10, and hear sounds generated in connection with other functions of the device 10. The sound processing circuit 68 may include any appropriate buffers, decoders, amplifiers and so forth.

The display 24 may be coupled to the control circuit 32 by a video processing circuit 74 that converts video data to a video signal used to drive the display 18. The video processing circuit 74 may include any appropriate buffers, decoders, video data processors and so forth.

The electronic device 10 may further include one or more input/output (I/O) interface(s) 76. The I/O interface(s) 76 may be in the form of typical mobile telephone I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 76 and power to charge a battery of a power supply unit (PSU) 78 within the electronic device 10 may be received over the I/O interface(s) 76. The PSU 78 may supply power to operate the electronic device 10 in the absence of an external power source.

The electronic device 10 also may include various other components. For instance, a system clock 80 may clock components such as the control circuit 32 and the memory 54. A position data receiver 82, such as a global positioning system (GPS) receiver, may be involved in determining the location of the electronic device 10. A local wireless transceiver 84, such as a Bluetooth chipset, may be used to establish communication with a nearby device, such as an accessory (e.g., a PHF device), another mobile radio terminal, a computer or another device.

Although certain embodiments have been shown and described, it is understood that equivalents and modifications falling within the scope of the appended claims will occur to others who are skilled in the art upon the reading and understanding of this specification.

What is claimed is:

1. A camera assembly, comprising:
   a touch sensitive electronic viewfinder;
   focusable imaging optics;
   an image sensor for converting light focused by the imaging optics into image data in the form of a preview video signal of a scene that contains a moving object; and
   a controller configured to:
     display the preview video signal on the touch sensitive electronic viewfinder;
     analyze the video signal to track movement of the moving object;
     establish a touch area of the touch sensitive electronic viewfinder that when touched by a user selects the moving object;
     maintain the touch area for selecting the moving object in an active state in a former position of the object; and
     repeat the analysis of the video signal, the establishment of the touch area, and the maintenance of the active state so that the touch area for selecting the moving object moves in a path that follows movement of the object.

2. The camera assembly of claim 1, wherein the touch area remains active in the former position for a predetermined amount of time.

3. The camera assembly of claim 1, wherein the object is an object that is recognized using a recognition engine or optical flow processing.

4. The camera assembly of claim 1, wherein in response to detection of touching of the touch area, the controller is further configured to control focusing of the imaging optics so that the camera assembly is focused on the object.

5. The camera assembly of claim 4, wherein the controller is further configured to capture image data and to store a photograph of the scene while the camera assembly is focused on the object.

6. The camera assembly of claim 1, wherein the analysis includes detecting the object as a possible focus target.

7. The camera assembly of claim 6, wherein the controller is further configured to graphically highlight the possible focus target on the electronic viewfinder.

8. The camera assembly of claim 1, wherein at least one of a position of the touch area, a movement of the touch area or a size of the touch area is adjusted based on a model that predicts an amount of time a user will take to touch a displayed representation of the object.

9. The camera assembly of claim 1, wherein the touch area further includes a portion of the electronic viewfinder corresponding to a predicted location of the object.

10. A method of focusing a camera assembly on a moving object, comprising:
    generating a preview video signal of a scene containing the moving object and displaying the preview video signal on a touch sensitive electronic viewfinder of the camera assembly;
    analyzing the video signal to track movement of the moving object;
    establishing a touch area of the touch sensitive electronic viewfinder of the camera assembly that when touched by a user selects the moving object;
    maintaining the touch area for selecting the moving object in an active state in a former position of the object; and
    repeating the analyzing of the video signal, the establishing of the touch area, and the maintaining of the active state so that the touch area for selecting the moving object moves in a path that follows movement of the object.

11. The method of claim 10, wherein the touch area remains active in the former position for a predetermined amount of time.

12. The method of claim 10, wherein the object is an object that is recognized using a recognition engine or optical flow processing.

13. The method of claim 10, further comprising detecting touching of the touch area and focusing the camera assembly on the object.

14. The method of claim 13, further comprising capturing image data of the scene and storing a photograph of the scene while the camera assembly is focused on the object.

15. The method of claim 10, further comprising detecting the object as a possible focus target.

16. The method of claim 15, further comprising graphically highlighting the possible focus target on the electronic viewfinder.

17. The method of claim 10, further comprising adjusting at least one of a position of the touch area, a movement of the touch area or a size of the touch area based on a model that predicts an amount of time a user will take to touch a displayed representation of the object.

18. The camera assembly of claim 1, wherein the controller is further configured to, in response to detection of touching of the touch area, adjust at least one of a zoom setting so as to increase a relative size of the moving object in the viewfinder or a camera setting to adjust at least one of white balance, sensitivity, brightness, or flash settings based on the moving object.

* * * * *